United States Patent
Virajamangala et al.

(10) Patent No.: US 10,102,146 B2
(45) Date of Patent: Oct. 16, 2018

(54) MEMORY SYSTEM AND OPERATING METHOD FOR IMPROVING REBUILD EFFICIENCY

(71) Applicant: SK hynix Inc., Gyeonggi-do OT (KR)

(72) Inventors: Shwetashree Virajamangala, San Jose, CO (US); Nagabhushan Hegde, Milpitas, CA (US); Frederick K. H. Lee, Mountain View, CA (US)

(73) Assignee: SK Hynix Inc., Gyeonggi-do (KR)

( * ) Notice: Subject to any disclaimer, the term of this patent is extended or adjusted under 35 U.S.C. 154(b) by 0 days.

(21) Appl. No.: 15/082,990

(22) Filed: Mar. 28, 2016

(65) Prior Publication Data
US 2016/0283401 A1 Sep. 29, 2016

Related U.S. Application Data

(60) Provisional application No. 62/138,619, filed on Mar. 26, 2015.

(51) Int. Cl.
| | |
|---|---|
| *G06F 12/00* | (2006.01) |
| *G06F 12/122* | (2016.01) |
| *G06F 12/123* | (2016.01) |
| *G06F 12/02* | (2006.01) |
| *G06F 1/30* | (2006.01) |

(52) U.S. Cl.
CPC ............ *G06F 12/122* (2013.01); *G06F 1/30* (2013.01); *G06F 12/0246* (2013.01); *G06F 12/123* (2013.01)

(58) Field of Classification Search
CPC .. G06F 12/122; G06F 12/123; G06F 12/0246; G06F 1/30
See application file for complete search history.

(56) References Cited

U.S. PATENT DOCUMENTS

| | | | |
|---|---|---|---|
| 8,838,911 B1* | 9/2014 | Hubin | H04N 5/76 |
| | | | 711/147 |
| 9,032,138 B2 | 5/2015 | Choi et al. | |
| 2007/0136553 A1* | 6/2007 | Sinclair | G06F 12/0246 |
| | | | 711/203 |
| 2007/0136555 A1* | 6/2007 | Sinclair | G06F 3/0605 |
| | | | 711/203 |

(Continued)

OTHER PUBLICATIONS

C. Zhang et al, Deterministic Crash Recovery for NAND Flash Based Storage Systems, Proc. 2014 51st ACM/EDAC/IEEE Design Automation Conference, pp. 1-6, Jun. 2014.

*Primary Examiner* — Prasith Thammavong
(74) *Attorney, Agent, or Firm* — IP & T Group LLP

(57) ABSTRACT

Methods may include after a power loss, determining a most recently saved section of a logical block addressing (LBA) table, a previous section saved prior to the most recently saved section of the LBA table, and a least recently saved section of the LBA table, reading an open super block and updating entries in the LBA table from the most recently saved section through to the least recently saved section, reading a newest closed super block from a plurality of closed super blocks and updating entries in the LBA table from the previous section saved prior to the most recently saved section through to the least recently saved section, and reading an oldest super block and updating entries in the LBA table in the least recently saved section.

12 Claims, 9 Drawing Sheets

(56) References Cited

U.S. PATENT DOCUMENTS

| | | | |
|---|---|---|---|
| 2008/0212769 A1* | 9/2008 | Patel | H04L 9/0631 |
| | | | 380/28 |
| 2009/0168525 A1* | 7/2009 | Olbrich | G06F 13/1657 |
| | | | 365/185.11 |
| 2009/0204824 A1* | 8/2009 | Lin | G06F 12/0246 |
| | | | 713/193 |
| 2012/0254503 A1* | 10/2012 | Chiu | G06F 3/0619 |
| | | | 711/103 |
| 2014/0129874 A1* | 5/2014 | Zaltsman | G06F 11/108 |
| | | | 714/6.11 |
| 2017/0060768 A1* | 3/2017 | Zhang | G06F 3/0619 |

* cited by examiner

MEMORY SYSTEM AND OPERATING METHOD FOR IMPROVING REBUILD EFFICIENCY

CROSS-REFERENCE TO RELATED APPLICATIONS

This application claims the benefit of U.S. Provisional Application No. 62/138,619 filed Mar. 26, 2015, the entire contents of which are incorporated herein by reference.

BACKGROUND

1. Field

Exemplary embodiments of the present disclosure relate to a memory system and an operating method thereof.

2. Description of the Related Art

The computer environment paradigm has shifted to ubiquitous computing systems that can be used anytime and anywhere. Due to this fact, the use of portable electronic devices such as mobile phones, digital cameras, and notebook computers has rapidly increased. These portable electronic devices generally use a memory system having memory devices, that is, a data storage device. The data storage device is used as a main memory device or an auxiliary memory device of the portable electronic devices.

Data storage devices using memory devices provide excellent stability, durability, high information access speed, and low power consumption, since they have no moving parts. Examples of data storage devices having such advantages include universal serial bus (USB) memory devices, memory cards having various interfaces, and solid state drives (SSD).

SUMMARY

Aspects of the invention include memory systems. The systems may include a memory device including a plurality of closed super blocks and an open super block, a logical block addressing (LBA) table including a plurality of sections; and a controller suitable for, after a power loss, determining a most recently saved section of the LBA table, a previous section saved prior to the most recently saved section of the LBA table, and a least recently saved section of the LBA table, reading the open super block and updating entries in the LBA table from the most recently saved section through to the least recently saved section, reading a newest closed super block from the plurality of super blocks and updating entries in the LBA table from the previous section saved prior to the most recently saved section through to the least recently saved section; and reading an oldest super block and updating entries in the LBA table in the least recently saved section.

Further aspects of the invention include methods. The methods may include, after a power loss, determining a most recently saved section of a logical block addressing (LBA) table, a previous section saved prior to the most recently saved section of the LBA table, and a least recently saved section of the LBA table, reading an open super block and updating entries in the LBA table from the most recently saved section through to the least recently saved section, reading a newest closed super block from a plurality of closed super blocks and updating entries in the LBA table from the previous section saved prior to the most recently saved section through to the least recently saved section, and reading an oldest super block and updating entries in the LBA table in the least recently saved section.

DETAILED DESCRIPTION

Figure 1:
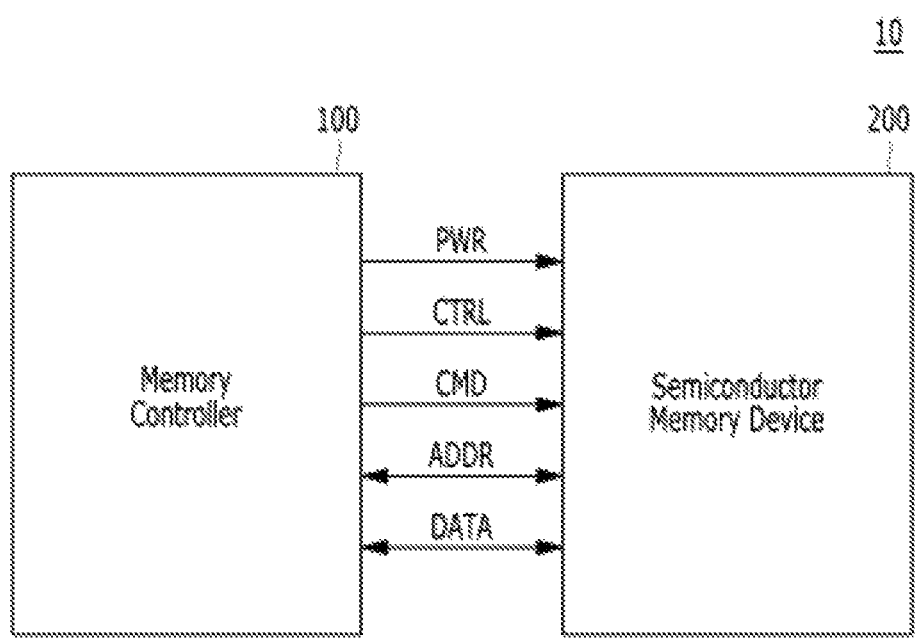
FIG. 1 is a block diagram schematically illustrating a memory system in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The invention can be implemented in numerous ways, including as a process; an apparatus; a system; a composition of matter; a computer program product embodied on a computer readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily suitable for performing the task at a given time or a specific component that is manufactured to perform the task. As used herein, the term 'processor' refers to one or more devices, circuits, and/or processing cores suitable for processing data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

FIG. 1 is a block diagram schematically illustrating a memory system 10 in accordance with an embodiment of the present invention.

Referring FIG. 1, the memory system 10 may include a memory controller 100 and a semiconductor memory device 200.

The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines. The semiconductor memory device 200 may receive power PWR through a power line and a control signal CTRL through a control line. The control signal may include a command latch enable (CLE) signal, an address latch enable (ALE) signal, a chip enable (CE) signal, a write enable (WE) signal, a read enable (RE) signal, and so on.

The memory controller 100 and the semiconductor memory device 200 may be integrated in a single semiconductor device. For example, the memory controller 100 and the semiconductor memory device 200 may be integrated in a single semiconductor device such as a solid state drive (SSD). The solid state drive may include a storage device for storing data therein. When the semiconductor memory system 10 is used in an SSD, operation speed of a host (not shown) coupled to the memory system 10 may remarkably improve.

The memory controller 100 and the semiconductor memory device 200 may be integrated in a single semiconductor device such as a memory card. For example, the memory controller 100 and the semiconductor memory device 200 may be integrated in a single semiconductor device to configure a memory card such as a PC card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and a universal flash storage (UFS).

For another example, the memory system 10 may be provided as one of various elements including an electronic device such as a computer, an ultra-mobile PC (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, one of electronic devices of a home network, one of electronic devices of a computer network, one of electronic devices of a telematics network, a radio-frequency identification (RFID) device, or elements devices of a computing system.

Figure 2:
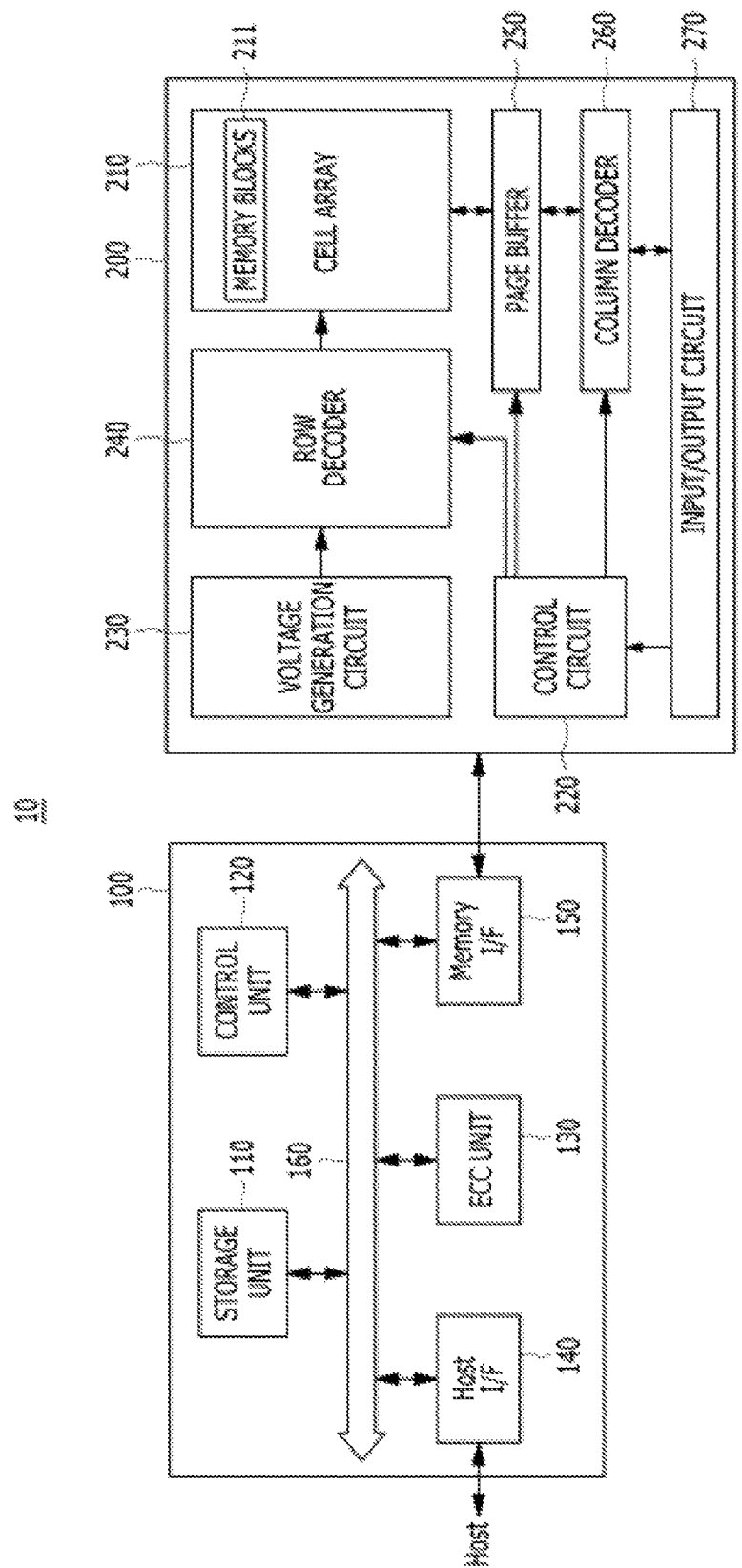
FIG. 2 is a block diagram illustrating a memory system in accordance with an embodiment of the present invention.

FIG. 2 is a detailed block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device, and in particular, store data to be accessed by the host device.

The host device may be implemented with any one of various kinds of electronic devices. In some embodiments, the host device may include an electronic device such as a desktop computer, a workstation, a three-dimensional (3D) television, a smart television, a digital audio recorder, a digital audio player, a digital picture recorder, a digital picture player, a digital video recorder and a digital video player. In some embodiments, the host device may include a portable electronic device such as a mobile phone, a smart phone, an e-book, an MP3 player, a portable multimedia player (PMP), and a portable game player.

The memory device 200 may store data to be accessed by the host device.

The memory device 200 may be implemented with a volatile memory device such as a dynamic random access memory (DRAM) and a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM) and a resistive RAM (RRAM).

The controller 100 may control storage of data in the memory device 200. For example, the controller 100 may control the memory device 200 in response to a request from the host device. The controller 100 may provide the data read from the memory device 200, to the host device, and store the data provided from the host device into the memory device 200.

The controller 100 may include a storage unit 110, a control unit 120, the error correction code (ECC) unit 130, a host interface 140 and a memory interface 150, which are coupled through a bus 160.

The storage unit 110 may serve as a working memory of the memory system 10 and the controller 100, and store data for driving the memory system 10 and the controller 100. When the controller 100 controls operations of the memory device 200, the storage unit 110 may store data used by the controller 100 and the memory device 200 for such operations as read, write, program and erase operations.

The storage unit 110 may be implemented with a volatile memory. The storage unit 110 may be implemented with a static random access memory (SRAM) or a dynamic random access memory (DRAM). As described above, the storage unit 110 may store data used by the host device in the memory device 200 for the read and write operations. To store the data, the storage unit 110 may include a program memory, a data memory, a write buffer, a read buffer, a map buffer, and so forth.

The control unit 120 may control general operations of the memory system 10, and a write operation or a read operation for the memory device 200, in response to a write request or a read request from the host device. The control unit 120 may drive firmware, which is referred to as a flash translation layer (FTL), to control the general operations of the memory system 10. For example, the FTL may perform operations such as logical to physical (L2P) mapping, wear leveling, garbage collection, and bad block handling. The L2P mapping is known as logical block addressing (LBA).

The ECC unit 130 may detect and correct errors in the data read from the memory device 200 during the read operation. The ECC unit 130 may not correct error bits when the number of the error bits is greater than or equal to a threshold number of correctable error bits, and may output an error correction fail signal indicating failure in correcting the error bits.

In some embodiments, the ECC unit 130 may perform an error correction operation based on a coded modulation such as a low density parity check (LDPC) code, a Bose-Chaudhuri-Hocquenghem (BCH) code, a turbo code, a turbo product code (TPC), a Reed-Solomon (RS) code, a convolution code, a recursive systematic code (RSC), a trellis-coded modulation (TCM), a Block coded modulation (BCM), and so on. The ECC unit 130 may include all circuits, systems or devices for the error correction operation.

The host interface 140 may communicate with the host device through one or more of various interface protocols such as a universal serial bus (USB), a multi-media card (MMC), a peripheral component interconnect express (PCI-E), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the CPU 120. When the memory device 200 is a flash memory such as a NAND flash memory, the memory interface 150 may generate control signals for the memory and process data under the control of the CPU 120.

The memory device 200 may include a memory cell array 210, a control circuit 220, a voltage generation circuit 230, a row decoder 240, a page buffer 250, a column decoder 260, and an input/output circuit 270. The memory cell array 210 may include a plurality of memory blocks 211 and may store data therein. The voltage generation circuit 230, the row decoder 240, the page buffer 250, the column decoder 260 and the input/output circuit 270 form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages having various levels. For example, in an erase operation, the voltage generation circuit 230 may generate operation voltages having various levels such as an erase voltage and a pass voltage.

The row decoder 240 may be connected to the voltage generation circuit 230, and the plurality of memory blocks 211. The row decoder 240 may select at least one memory block among the plurality of memory blocks 211 in response to a row address RADD generated by the control circuit 220, and transmit operation voltages supplied from the voltage generation circuit 230 to the selected memory blocks among the plurality of memory blocks 211.

The page buffer 250 is connected to the memory cell array 210 through bit lines BL (not shown). The page buffer 250 may precharge the bit lines BL with a positive voltage, transmit/receive data to/from a selected memory block in program and read operations, or temporarily store transmitted data, in response to a page buffer control signal generated by the control circuit 220.

The column decoder 260 may transmit/receive data to/from the page buffer 250 or transmit/receive data to/from the input/output circuit 270.

The input/output circuit 270 may transmit, to the control circuit 220, a command and an address, transmitted from an external device (e.g., the memory controller 100), transmit data from the external device to the column decoder 260, or output data from the column decoder 260 to the external device, through the input/output circuit 270.

The control circuit 220 may control the peripheral circuit in response to the command and the address.

Figure 3:
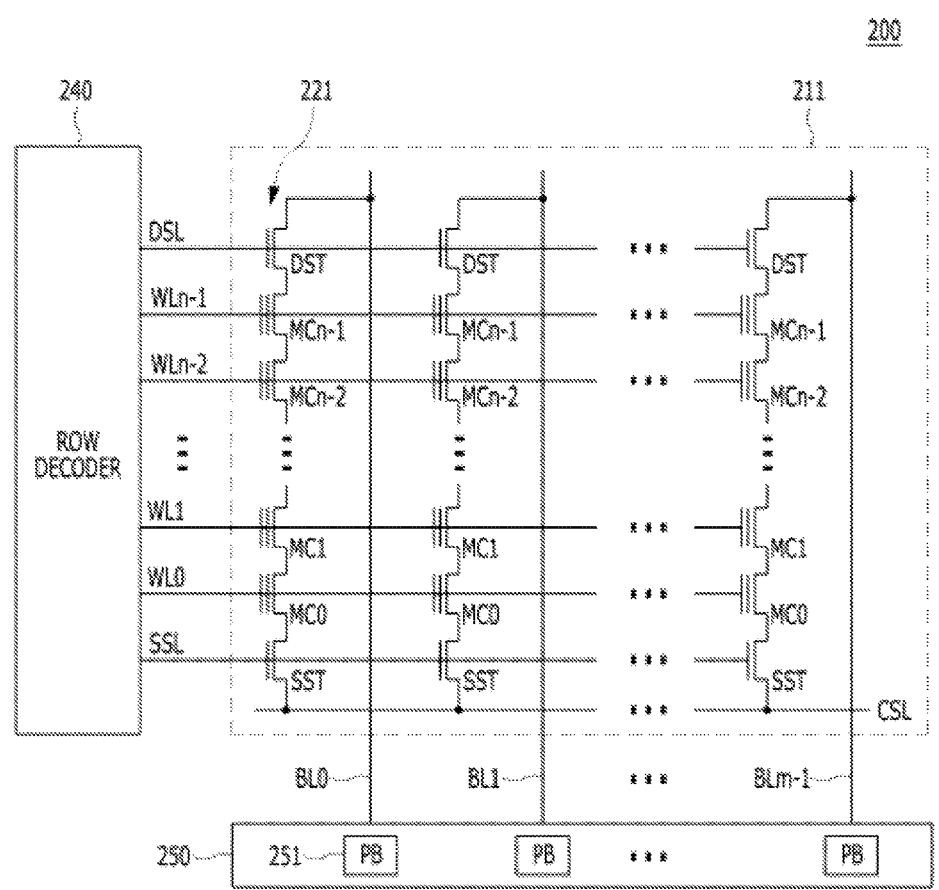
FIG. 3 is a circuit diagram illustrating a memory block of a memory device in accordance with an embodiment of the present invention.

FIG. 3 is a circuit diagram illustrating a memory block of a semiconductor memory device in accordance with an embodiment of the present invention. For example, a memory block of FIG. 3 may be the memory blocks 211 of the memory cell array 200 shown in FIG. 2.

Referring to FIG. 3, the memory blocks 211 may include a plurality of cell strings 221 coupled to bit lines BL0 to BLm−1, respectively. The cell string of each column may include one or more drain selection transistors DST and one or more source selection transistors SST. A plurality of memory cells or memory cell transistors may be serially coupled between the selection transistors DST and SST. Each of the memory cells MC0 to MCn−1 may be formed of a multi-level cell (MLC) storing data information of multiple bits in each cell. The cell strings 221 may be electrically coupled to the corresponding bit lines BL0 to BLm−1, respectively.

In some embodiments, the memory blocks 211 may include a NAND-type flash memory cell. However, the memory blocks 211 are not limited to the NAND flash memory, but may include NOR-type flash memory, hybrid flash memory in which two or more types of memory cells are combined, and one-NAND flash memory in which a controller is embedded inside a memory chip.

Figure 4:
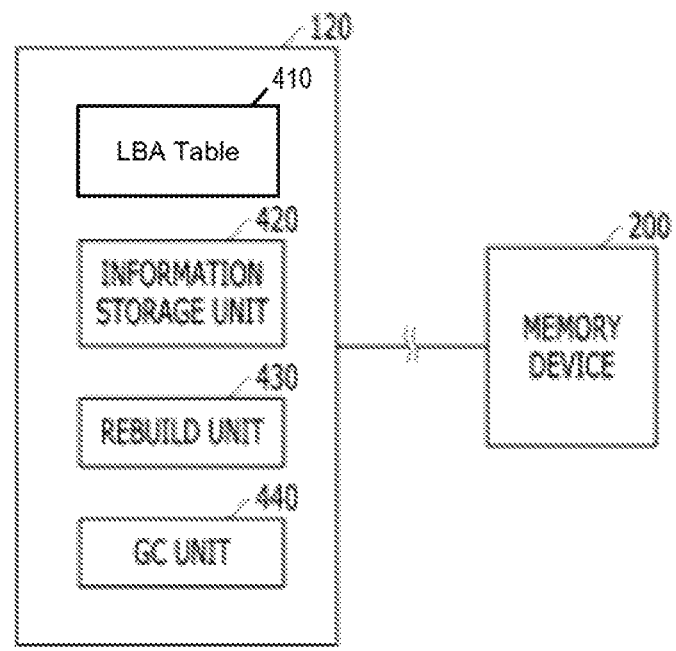
FIG. 4 is a diagram illustrating a control unit of a memory controller in accordance with an embodiment of the present invention.

FIG. 4 is a diagram illustrating a control unit of a memory controller in accordance with an embodiment of the present invention. For example, the control unit of FIG. 4 may depict the control unit 120 of the controller 100 in FIG. 2.

Referring to FIG. 4, the control unit 120 of the controller 100 may be coupled to the memory device 200 including a plurality of a super blocks through an interface (e.g., the memory interface 150 of FIG. 2).

The control unit 120 may include a logical block addressing (LBA) table 410, an information storage unit 420, a rebuild unit 430 and a garbage collection (GC) unit 440. The LBA table 410 may be a mapping table from logical block address (LBA) to physical address that is part of the flash translation layer (FTL). The rebuild unit 430 may be configured to rebuild the LBA table 410 based on information during SPOR. The GC unit 440 may perform any needed garbage collection operation during SPOR. It is noted that FIG. 4 merely illustrates that the control unit 120 includes elements for the operation with respect to SPOR.

Different from hard disks, the "erase-before-write" limitation of the memory device such as a flash memory requires a special layer of system software called a flash translation layer (FTL) to emulate a block device interface for backward compatibility. File systems and applications may use flash memory as if they were using a hard disk. Logical to Physical (L2P) mapping system known as logical block addressing (LBA) is part of the FTL.

Since a table for FTL or LBA (hereinafter LBA table) may be in a dynamic random access memory (DRAM), which is a volatile memory, when sudden power loss happens, the LBA table will be lost, which causes data loss. To prevent data loss, firmware must be able to rebuild the up-to-date table when power is on. Frequently writing the LBA table to the memory device (e.g., NAND flash memory) would cause significant write performance degradation. With limited performance degradation, how to perform fast sudden power-off recovery (SPOR) is an important and difficult task.

Embodiments and examples disclosed herein improve the performance of a memory system (e.g., a solid state drive (SSD)) and in particular the overall SPOR time (e.g., reduce the amount of time between when power is restored to the memory system after a sudden power loss and when a host is able to begin writing to the memory system).

During SPOR processes, both rebuilding a logical block address (LBA) table and doing any needed garbage collection (GC) are performed. Embodiments disclosed herein include methods, systems, processes and devices that reduce the number of super blocks needed to be read from a memory device (e.g., NAND flash memory) at power up as well as accelerating the performance of garbage collection.

Figure 5:
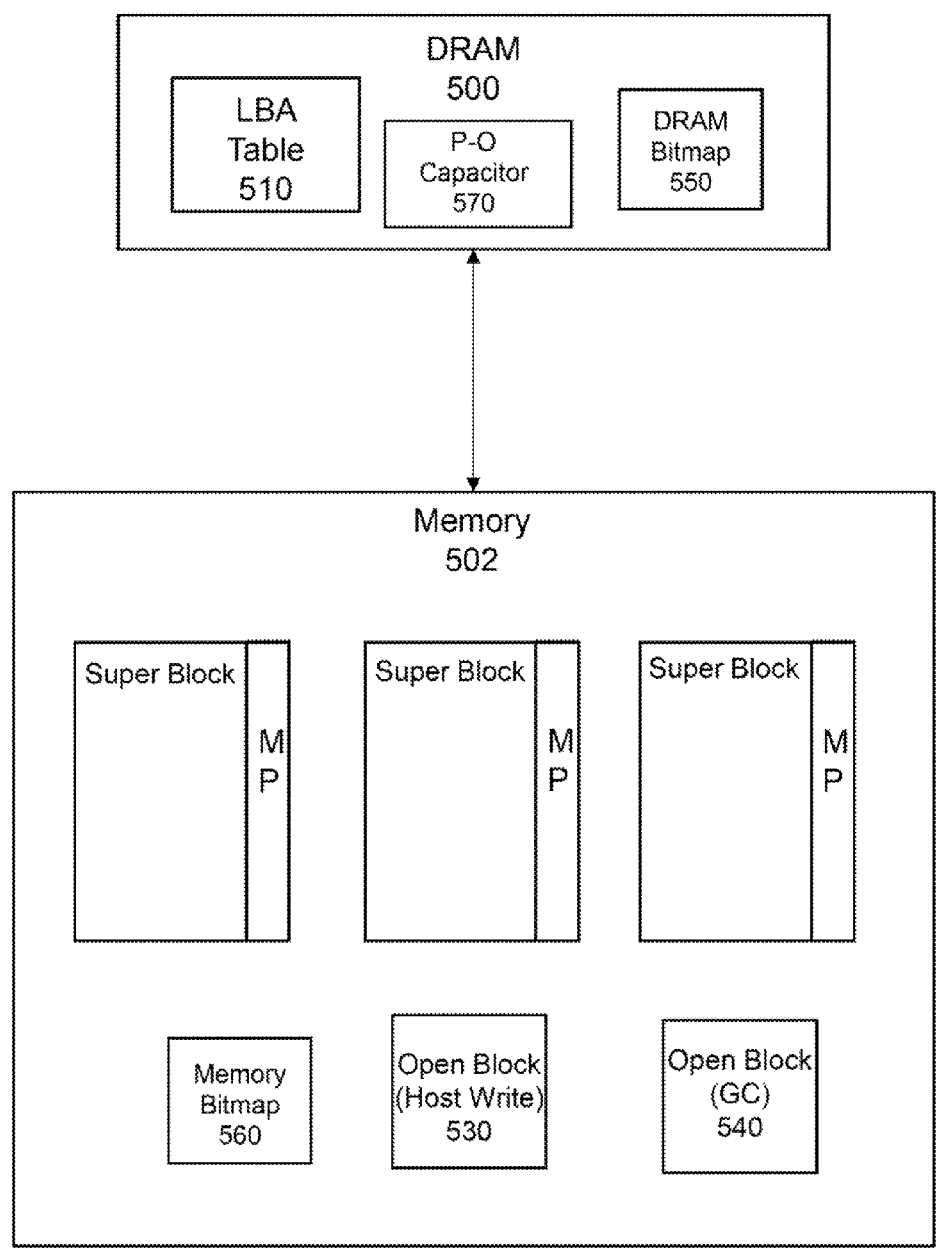
FIG. 5 is a diagram of a memory system according to aspects of the invention.

Referring next to FIG. 5, a diagram of a system 50 is shown. The system 50 includes a DRAM 500 and a memory 502. The device 500 includes an LBA table 510, a DRAM bitmap storage 550 and a power-off capacitor 570. In the examples described herein, the device 500 may be housed on a volatile memory (e.g., a DRAM) such that, in the event of a sudden power loss, the LBA table 510 is required to be rebuilt. The DRAM bitmap storage 550 may be configured for storing bitmaps corresponding to each of the super blocks that are stored on the memory 502. The power-off capacitor 570 is configured to store enough power such that, in the event of a power loss, there is sufficient time to transfer contents of the DRAM bitmap storage (and/or other operations) to the memory bitmap storage 560 of the memory 502.

The memory 502 includes, among other components, a plurality of super blocks, where each of the super blocks may include a meta-page MP when closed, an open block for host writes 530, an open block for garbage collection (GC) 540, etc. The memory 502 may be a NAND memory implemented as an SSD, or other types of suitable memory as will be understood to those of skill in the art from the description herein. The memory also includes a memory bitmap storage 560 that is configured to store bitmaps corresponding to super blocks of the memory 502, and the bitmap storage 560 may be configured to receive bitmaps stored at the DRAM bitmap storage 550.

In the event of a sudden power loss, data on the LBA table 510 will be lost and it will need to be rebuilt. Previous rebuilding procedures or SPOR processes require time consuming steps, such as requiring hardware (e.g., memory 502) access to read every super block and to identify closed and open blocks by reading every valid block from previous signature scans. Bubble sorting of valid blocks may also be required, which again is time consuming.

Also, previous methods involve having sections of the LBA table saved periodically in a round-robin fashion, together with a list of the current "dirty" superblocks. (A dirty superblock is one that contains at least one LBA whose corresponding entry in the LBA table is not up-to-date, i.e., dirty). During rebuild after sudden power loss, the saved LBA table is reloaded into DRAM and the meta pages of the dirty superblocks, including any open superblock(s), are replayed as in a normal rebuild.

From the perspective of rebuilding speed, this scheme is already very efficient. Reloading the saved LBA table into DRAM is a fixed cost which cannot be avoided, since this step is needed even in normal powering up of a drive (e.g., powering up after a solicited power down of the drive). Consequently, one way to shorten rebuild time is to reduce the amount of time spent on scanning the meta pages of the dirty superblocks and updating the corresponding entries in the LBA table. In fact, the latter is a major bottleneck, since updating entries in the LBA table are random access operations in DRAM, which are known to be slow.

To reduce both the scanning and updating time, one straightforward method is to have fewer number of dirty superblocks. However, fewer dirty superblocks implies sections of the LBA table need to be saved more frequently during run time, which impacts drive performance. In addition, more system blocks may be needed for storing the saved LBA table, which means fewer empty user data blocks available for over-provisioning, thus increasing write amplification and ultimately leads to lower TBD (total bytes written) for a drive. Hence, reducing the number of dirty superblocks that require scanning comes at a price, and an optimal number should be chosen to balance among rebuild time, drive performance and drive endurance Therefore, methods, systems, processes and devices disclosed herein seek to improve the recovery time after a sudden power loss.

Figure 6:
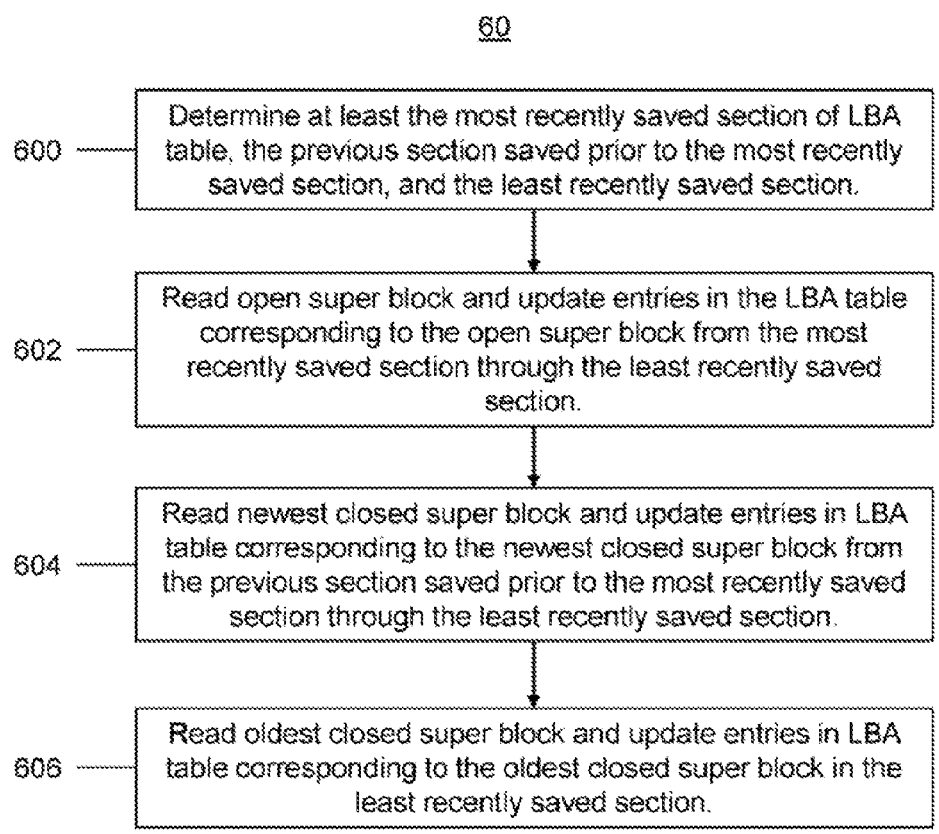
FIG. 6 is a flowchart of steps in a method for rebuilding an LBA table in accordance with aspects of the invention.
Figure 7:
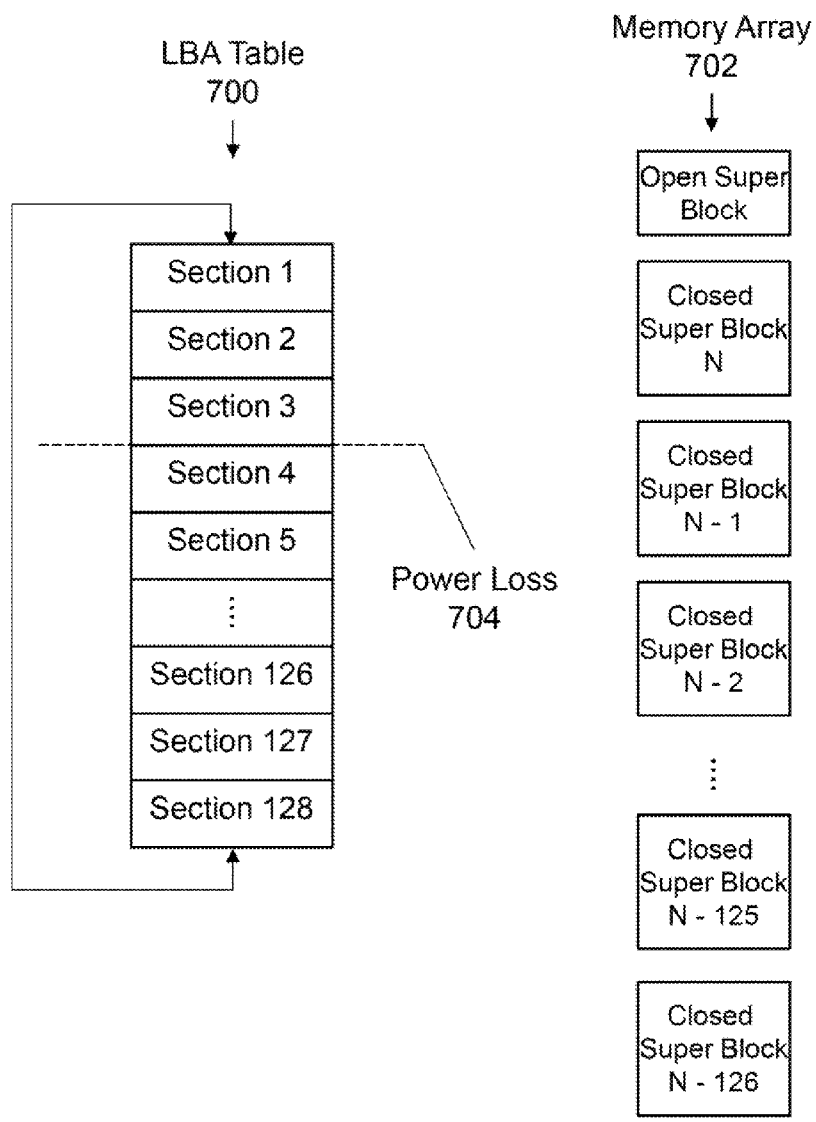
FIG. 7 is a diagram illustrating an LBA table and a memory array according to aspects of the invention.

FIG. 6 is a flowchart 60 of steps for rebuilding an LBA table. FIG. 7 is a diagram of an LBA table 700 and a memory array 702. In the examples shown herein (through FIGS. 6-13), an LBA table of 128 sections is used for descriptive purposes. Also, the following metrics are used for exemplary purposes:

Number of superblocks per drive=4096
Number of dies per superblock=32
Number of physical blocks per superblock=64 (dual-plane)
Number of pages per physical block=256
Page size=16 kB
Logical page size=4 kB
Number of logical pages per page=4

These metrics and sizes are exemplary and not exclusive. Those of skill in the art will understand other suitable metrics, sizes, etc., for effectuating the invention from the disclosure herein.

Referring to FIGS. 6 and 7, at block 600, at least the most recently saved section, the previous section saved prior to the most recently saved section, and the least recently saved section of the LBA table 700 from a power loss are determined.

At FIG. 7, the LBA table 700 is one that follows a round-robin scheme, although this is for illustration and is not intended to limit the invention to such schemes. In other words, when the last section is saved, the first section is then used. In the example shown with 128 sections, section 128 is the "last" section and section 1 is the "first section". A power loss 704 is shown occurring after section 3 is saved but before section 4. Thus, in the example, section 3 would be the most recently saved section, section 2 would be the previous section saved prior to the most recently saved section, and section 4 would be the least recently saved section of the LBA table 700.

Each of the sections may correspond to a super block, such as the super blocks in memory array 702. One section of the LBA table 700 may be saved to the memory 502 each time a super block is closed. Thus, in the example, there are 128 dirty super blocks at any given time. N is used to denote the newest closed super block.

At step 602, the open super block is read and the entries in the LBA table corresponding to the open super block from the most recently saved section through the least recently saved section are updated. Thus, referring to the memory array 702, the open super block is read, and the entries in the LBA table are updated from section 3 (most recently saved section) through section 4 (least recently saved section). In other words, section 3 is updated, then section 2 is updated, then section 1 is updated, then section 128 is updated and so forth until section 4 is updated.

At step 604, the newest closed super block is read and the entries in the LBA table corresponding to the newest closed super block from the previous section saved prior to the most recently saved section through the least recently saved section are updated. Thus, referring to FIG. 7, the closed super block N would be read and the entries from section 2 of the LBA table 700 (the previous section saved prior to the most recently saved section, i.e. section 3) through section 4 of the LBA table 700 (the least recently saved section) are updated.

At step 606, the oldest closed super block is read and the entries in the LBA table corresponding to the oldest closed super block in the least recently saved section are updated. Thus, referring to FIG. 7, the closed super block N-126 is read and section 4 (the least recently saved section of the LBA table 700) is updated.

The described method of FIG. 6 is not limited to the enunciated steps. For example, similar steps may be conducted for each of the closed super blocks. These methods may include steps such as:

For superblock N, all corresponding entries, except those in section 3 of the LBA table 700, need to be updated.

For superblock N-1, all corresponding entries, except those in sections 2 and 3 of the LBA table 700, need to be updated.

For superblock N-2, all corresponding entries, except those in sections 1, 2 and 3 of the LBA table 700, need to be updated.

For superblock N-3, all corresponding entries, except those in sections 1, 2, 3 and 128 of the LBA table 700, need to be updated.

For superblock N-4, all corresponding entries, except those in sections 1, 2, 3, 127 and 128 of the LBA table 700, need to be updated.

. . .

For superblock N-124, all corresponding entries, except those in sections 4, 5 and 6 of the LBA table 700, need not be updated.

For superblock N-125, all corresponding entries, except those in sections 4 and 5 of the LBA table 700, need not be updated.

For superblock N-126, all corresponding entries, except those in section 4 of the LBA table 700, need not be updated.

In essence, this method exploits the fact that any corresponding entry residing in sections of the LBA table 700 that are saved after a dirty superblock is closed already contains the physical address to the corresponding logical page in that dirty superblock. Thus, there is no need to update such an entry. (Note, however, that this does not mean that the entry is clean, since that LBA can be rewritten again in the subsequent dirty superblocks).

For a pure random write workload, the LBAs in each dirty superblock may be evenly distributed over the entire LBA range. As a result, for a 1 TB drive in the above power loss scenario, the number of entries that require updating on average=64×256×4×(127+126+ . . . +1)/128=4161536. This is equal to a 50% reduction of updates. In fact, this significant reduction holds for any drive capacity and any number of dirty superblocks. (If there are valid logical pages in the open superblock, the reduction will be slightly less than 50%).

On the other hand, if the workload is not purely random, the amount of updates saved per instance of sudden power loss will be a random number. However, the amount of updates saved when averaged over many instances of sudden power loss is still 50%, since sudden power loss can occur after any one of the 128 sections of the LBA table 700 is saved with equal probability. In other words, the amount of savings exhibits a statistical distribution with an average value of 50% and a non-zero variance. For a pure random workload, the average value is 50% and a zero variance. Thus, the amount of savings per instance of sudden power loss is also 50%. The variance, which is workload dependent, can be determined by simulations.

To implement this method, the only additional information required is knowing which section of the LBA table 700 was last saved to memory before sudden power loss occurs. The section number can then be saved to the system area in memory within the time span provided by the power off capacitor 570.

Figure 8:
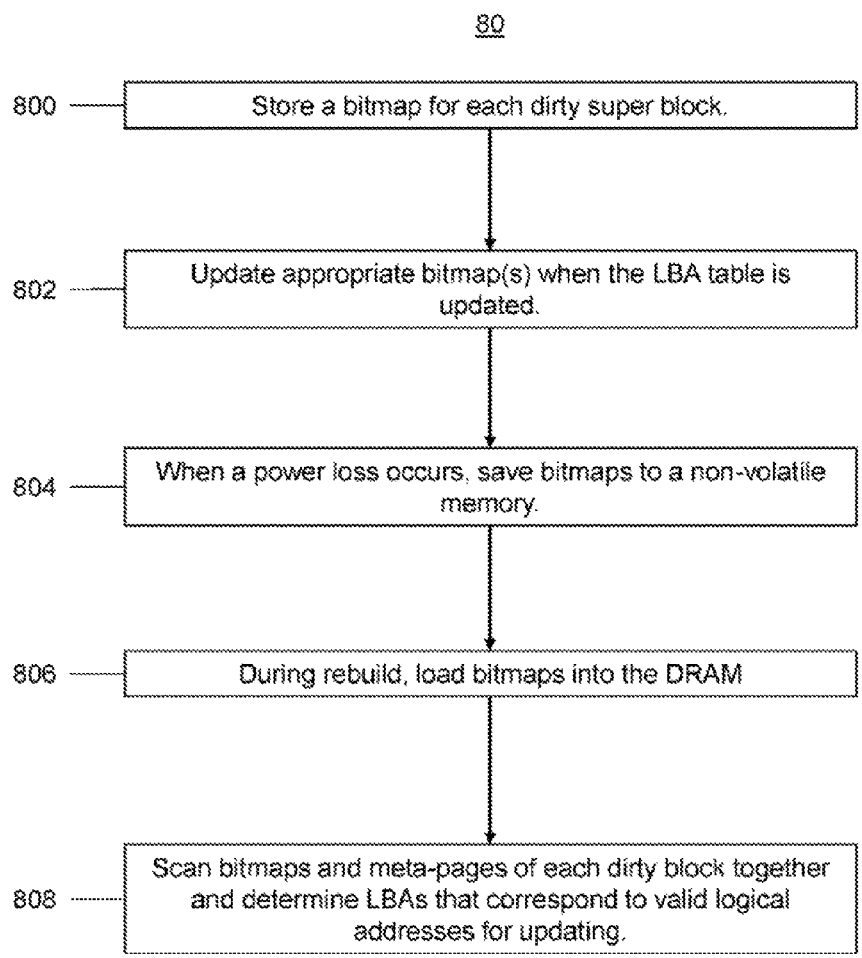
FIG. 8 is a flowchart of steps in a method for rebuilding an LBA table using bitmaps according to aspects of the invention.
Figure 9:
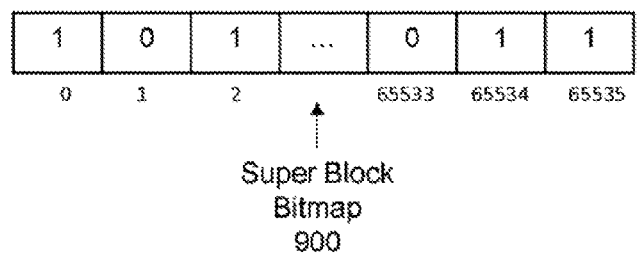
FIG. 9 is a diagram of a bitmap according to aspects of the invention.
Figure 10:
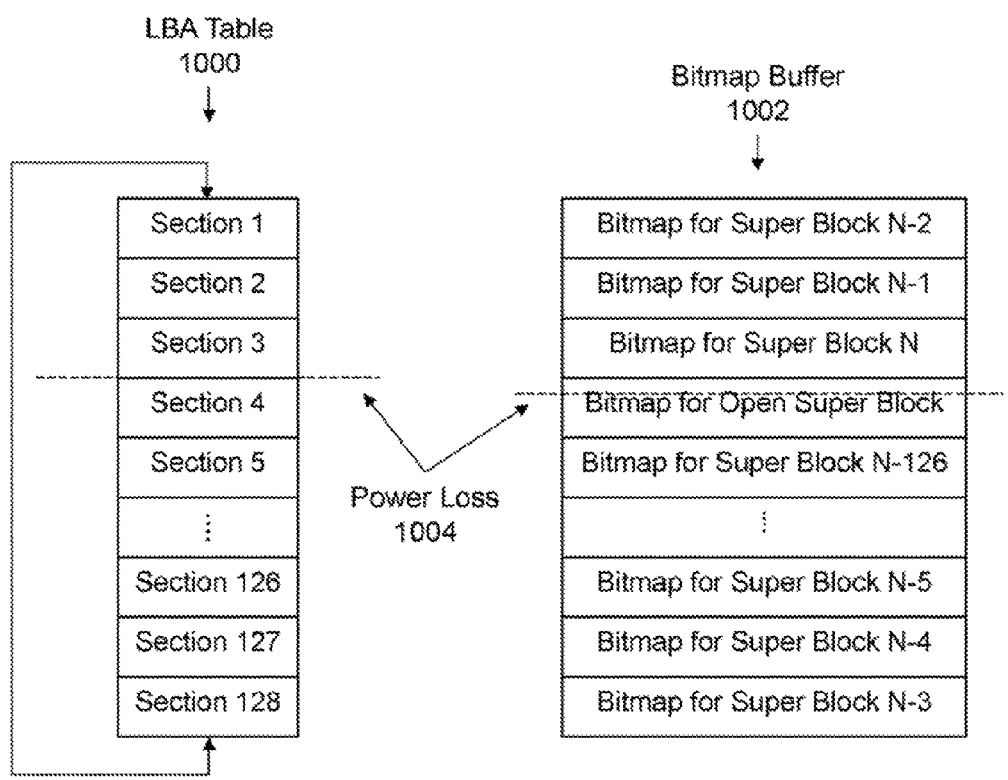
FIG. 10 is a diagram of an LBA table and a bitmap buffer in accordance with aspects of the invention.

Referring next to FIGS. 8, 9 and 10, methods, systems, processes, and devices for using bitmaps for LBA table rebuild are shown. FIG. 8 is a flowchart 80 of steps for using bitmaps for LBA table rebuild. FIG. 9 is a diagram of an example bitmap. FIG. 10 is a diagram of an LBA table 1000 and a bitmap buffer 1002, the bitmap buffer 1002 being stored as a circular buffer.

At step 800, a bitmap for each dirty super block is generated and stored. The bitmaps may be stored, for example, in the DRAM bitmap storage 550, the memory bitmap storage 560, etc. At step 802, the appropriate bitmaps are updated each time the LBA table is updated.

Each bitmap 900 may indicate whether a logical page in a corresponding dirty super block is valid. Thus, every time the LBA table 1000 is updated during a normal write or trim operation, the appropriate bitmaps are also updated. For example, the bitmap 900 shows a 8 kB bitmap for a dirty super block. The values in each bit correspond to weather the logical page corresponding to that bit is valid.

At step 804, when a sudden power loss occurs, the bitmaps are saved to a non-volatile memory. For example, the bitmaps may be saved and updated on the DRAM bitmap storage 550, but, at a sudden power loss, the bitmaps are transferred (e.g., saved) from the DRAM bitmap storage 550 to the memory bitmap storage 560 within the time permitted by the power off capacitor 570.

Thus, at step 806, the bitmaps may be loaded into the DRAM, and, at step 808, bitmaps and meta-pages of each dirty super block are scanned together the LBAs that correspond to valid logical address are determined, such that these LBAs are updated.

With the addition of bitmaps, unnecessary updates to the LBA table 1000 can now be eliminated. During rebuild, the LBA table 1000 and the bitmaps may be first loaded into DRAM. The bitmap and the meta pages of each dirty superblock are then scanned together, and only LBAs that correspond to valid logical pages are considered for updating. This ensures that entries corresponding to non-trimmed LBAs are updated at most once in the LBA table 1000, while those corresponding to trimmed LBAs are not updated at all.

In contrast, entries for non-trimmed LBAs can be updated multiple times without the bitmaps, while information about trimmed LBAs are lost after sudden power loss. In essence, the more invalid logical pages there are in the dirty superblocks, the more reduction in updates the bitmaps offer when compared to the case of no bitmaps.

For a given number of dirty superblocks, the number of invalid logical pages in the dirty superblocks is a function of both over-provisioning and the type of workload. The higher the amount of over-provisioning, the more invalid logical pages there are in the dirty superblocks. Analogously, the more hot data there are in a workload, the more invalid logical pages there are in the dirty superblocks, as LBAs corresponding to hot data will be overwritten more frequently in the dirty superblocks. If there are 5% of invalid logical pages in the 128 dirty superblocks, for instance, the overall reduction in updates compared with the original replay mechanism will be 52.5%.

The addition of bitmaps offers another very important advantage: the order in which the meta pages are replayed can be changed. Since only LBAs that correspond to valid logical pages are considered for updating, it is impossible to overwrite an entry in the LBA table with the physical address of an old logical page, even if the meta pages are replayed in a random order. As it turns out, the best replay order is to replay the meta pages in exact reverse order to which the logical pages are written, i.e., the meta data in the open superblock are scanned first, followed by the meta pages in the most recently closed dirty superblock, then the meta pages in the 2nd most recently closed dirty superblock, and so on. Continuing with the above example, if updating for the open superblock is done first, section 3 of the LBA table 1000 will be guaranteed clean, since no more updating is needed for this section according to the trend described in the previous section. Similarly, once updating for the most recently (newest) closed dirty superblock is done, section 2 of the LBA table 700, 1000 is guaranteed clean, as no more updating is required for this section. The same pattern repeats for the remaining dirty superblocks. In essence, after updating is completed for each dirty superblock, an additional section of the LBA table 700, 1000 becomes clean.

Since the LBA table 700, 1000 becomes partially clean as updating proceeds, host read and write commands can now be accepted "on-the-fly" before updating has been fully completed. This is critical for reducing the powering up latency users experience. To be more specific, after updating is completed for a subset of dirty superblocks, the controller can start to accept host read and write commands. If a host read or write command points to a clean section of the LBA table 700, 1000, the command will be immediately executed. Otherwise, execution will be delayed until that section of the LBA table becomes clean. The initial number of dirty superblocks to process, therefore, should be chosen based on the maximum delay a host read or write command will encounter if it points to a dirty section of the LBA table. This number will be small, since the number of average updates needed for a superblock decreases when the meta pages are replayed in reverse order.

In one example, each bitmap requires 8 kB of DRAM, since there are 64×256×4=65536 logical pages per superblock and 1 bit is used for each logical page. Therefore, if there are 128 bitmaps, 1 MB of DRAM is needed. This 1 MB of DRAM can be implemented as a circular buffer 1002, as the memory space can be reused after completing 1 round of saving. Moreover, 1 MB of data takes up exactly 1 strip of a system area superblock, and requires about 1.4 ms to encode. For F16 MLC NAND, programming time is no more than 3 ms. Therefore, the total time required to save to NAND after sudden power loss occurs is well within the 20 ms of extended power provided by the super capacitor 570. The meta pages for the open superblock can also be saved to the system area when sudden power loss occurs. This avoids scanning the meta data of each logical page during rebuild and further shortens rebuild time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A memory system, comprising:
   a memory device including a plurality of closed super blocks and an open super block, wherein the open super block is a super block open for further host writes or garbage collection, and the closed super blocks are super blocks closed from the further host writes or garbage collection;
   a logical block addressing (LBA) table including a plurality of sections; and
   a controller suitable for:
      after a power loss,
      determining a most recently saved section of the LBA table, a previous section saved prior to the most recently saved section of the LBA table, and a least recently saved section of the LBA table;
      reading the open super block and updating entries in the LBA table from the most recently saved section through to the least recently saved section;
      reading a newest closed super block from the plurality of super blocks and updating entries in the LBA table from the previous section saved prior to the most recently saved section through to the least recently saved section; and
      reading an oldest super block and updating entries in the LBA table in the least recently saved section.

2. The memory system of claim 1, wherein the LBA table follows a round-robin scheme.

3. The memory system of claim 1, further comprising a bitmap buffer including bitmaps corresponding to the super blocks, wherein the bitmaps include data as to whether logical addresses in a corresponding super block is valid.

4. The memory system of claim 3, wherein the controller is further suitable for updating bitmaps in the bitmap buffer when the LBA table is updated.

5. The memory system of claim 3, wherein the controller is further suitable for saving the bitmaps on the memory device when a sudden power loss occurs.

6. The memory system of claim 3, wherein the controller is further suitable for scanning the bitmaps and meta-pages of the super blocks together and determining LBAs that correspond to valid logical addresses for updating.

7. A method, comprising:
   after a power loss,
   determining a most recently saved section of a logical block addressing (LBA) table, a previous section saved prior to the most recently saved section of the LBA table, and a least recently saved section of the LBA table;
   reading an open super block and updating entries in the LBA table from the most recently saved section through to the least recently saved section, wherein the open super block is a super block open for further host writes or garbage collection;

reading a newest closed super block from a plurality of closed super blocks and updating entries in the LBA table from the previous section saved prior to the most recently saved section through to the least recently saved section, wherein the closed super blocks are super blocks closed from the further host writes or garbage collection; and reading an oldest super block and updating entries in the LBA table in the least recently saved section.

8. The method of claim 7, wherein the LBA table follows a round-robin scheme.

9. The method of claim 7, further comprising storing a bitmap for each super block, wherein the bitmaps include data as to whether logical addresses in a corresponding super block is valid.

10. The method of claim 9, further comprising updating the bitmaps when the LBA table is updated.

11. The method of claim 9, further comprising saving the bitmaps on a non-volatile memory device when a sudden power loss occurs.

12. The method of claim 11, further comprising scanning the bitmaps and meta-pages of the super blocks together and determining LBAs that correspond to valid logical addresses for updating.

* * * * *